US005401570A

United States Patent [19]

Heeks et al.

[11] Patent Number: 5,401,570

[45] Date of Patent: Mar. 28, 1995

[54] COATED FUSER MEMBERS

[75] Inventors: George J. Heeks, Rochester; Arnold W. Henry, Pittsford; David H. Pan, Rochester; Santokh S. Badesha, Pittsford, all of N.Y.

[73] Assignee: Xerox Corporation, Stamford, Conn.

[21] Appl. No.: 100,851

[22] Filed: Aug. 2, 1993

[51] Int. Cl.[6] .......................... B32B 15/06; B32B 25/20

[52] U.S. Cl. .................................. 428/332; 428/36.91; 428/36.92; 428/328; 428/329; 428/331; 428/336; 428/447; 428/448; 428/450; 430/99; 492/56; 492/59; 492/46

[58] Field of Search ............... 428/328, 329, 331, 332, 428/336, 36.9, 36.91, 36.92, 447, 448, 450; 29/132; 430/99; 492/56, 59

[56] References Cited

U.S. PATENT DOCUMENTS

| | | | |
|---|---|---|---|
| 4,029,827 | 6/1977 | Imperial et al. | 427/22 |
| 4,101,686 | 7/1978 | Strella et al. | 427/22 |
| 4,185,140 | 1/1980 | Strella et al. | 428/418 |
| 4,257,699 | 3/1981 | Lentz | 355/3 FU |
| 4,264,181 | 4/1981 | Lentz et al. | 355/3 FU |
| 4,272,179 | 6/1981 | Seanor | 355/3 FU |
| 4,373,239 | 2/1983 | Henry et al. | 29/132 |
| 4,518,655 | 5/1985 | Henry et al. | 428/329 |
| 4,711,818 | 12/1987 | Henry | 428/421 |

*Primary Examiner*—D. S. Nakarani
*Attorney, Agent, or Firm*—Eugene O. Palazzo; Zosan S. Soong

[57] ABSTRACT

A fuser member comprised of a substrate, thereover a silicone rubber containing a filler component therein, and wherein said filler component is reacted with a silicone hydride release oil.

15 Claims, No Drawings

COATED FUSER MEMBERS

BACKGROUND OF THE INVENTION

This invention generally relates to fusing members and, more specifically, the present invention relates to fuser roll functional release agents that, for example, enhance release of toner from a fuser roll. In embodiments, the release agent of the present invention is comprised of a hydride (SiH) functional oil that prevents offset by providing a coating on a fuser roll substrate, and which coating contains a filler that has been reacted with the silicone hydride oil preferably in the presence of a catalyst; and the use of reacted hydride functional oils as a functional release agent that prevents offsetting by providing a silicone coating on exposed high energy surfaces in oxidized or high filler content siloxane fuser rolls. Advantages of the fuser members of the present invention include avoiding or minimizing offsetting, improved fusing latitude, reduction in offsetting from preprinted forms, high thermal conductivity, and providing a siloxane release surface in those areas of a silicone coating that would normally have unacceptable high surface energy, and thus poor release. In embodiments, the release coatings of the present invention can be obtained by combining a hydride functional siloxane with active functional groups on filler components thereby providing a low surface energy silicone surface over the filler. The fuser members of the present invention, which can be selected for a number of known electrophotographic imaging and printing processes, possess a number of advantages as indicated herein, such as the elimination, or minimization of offsetting observed when fillers are used alone and not reacted with a silicone hydride release oil. The types of components such as rolls that can be provided with the coatings of the present invention are illustrated, for example, in U.S. Pat. Nos. 4,373,239 and 4,518,655, the disclosures of which are totally incorporated herein by reference.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is know. To fuse electroscopic toner material onto a support surface permanently by heat, it is usually necessary to elevate the temperature of the toner composition to a point at which the constituents of the toner material coalesce and become tacky. This heating causes the toner to flow to some extent into the fibers or pores of the support member, such as paper. Thereafter, as the toner cools, solidification of the toner causes it to be firmly bonded to the support.

Typically, the thermoplastic resin particles are fused to the substrate by heating to a temperature of between about 90° C. to about 160° C. or higher depending upon the softening range of the particular resin used in the toner. It is undesirable, however, to raise the temperature of the substrate substantially higher than about 200° C. because, for example, of the tendency of the substrate to discolor at such elevated temperatures, particularly when the substrate is paper.

Several methods for the thermal fusing of electroscopic toner images have been described in the prior art. These methods include the application of heat and pressure substantially concurrently by various means: a roll pair maintained in pressure contact, a belt member in pressure contact with a roll, and the like. Heat may be applied by heating one or both of the rolls, plate members or belt members. The fusing of the toner results when the proper combination of heat, pressure and contact time are provided.

During operation of a fusing system in which heat is applied to cause thermal fusing of the toner particles onto a support, both the toner image and the support are passed through a nip formed between the roll pair, plate, or belt members. The concurrent transfer of heat and the application of pressure in the nip effects the fusing of the toner image onto the support. It is important in the fusing process that no offset of the toner particles from the support to the fuser member takes place during normal operations. Toner offset onto the fuser member may subsequently transfer to other parts of the machine or onto the support in subsequent copying cycles, thus increasing the background or interfering with the material being copied. This is referred to as "hot offset" and occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desirable to provide a fusing surface which has a low surface energy to provide the necessary effective release. To insure and maintain good release properties of the fuser roll, it has become customary to apply release agents to the fuser members to insure that the toner is completely released from the fuser roll during the fusing operation. Typically, these materials are applied as thin films of, for example, silicone oils to prevent toner offset.

Described in U.S. Pat. Nos. 4,264,181, 4,257,699 and 4,272,179, all commonly assigned to the assignee of the present application, the disclosures of which are totally incorporated herein by reference, are fuser members and certain release agents. These patents describe specific fuser members and methods of fusing thermoplastic resin toner images to a substrate wherein a certain polymeric release agent having functional groups is applied to the surface of the fuser member. The fuser member comprises a base member having an elastomeric surface with a metal containing filler therein which has been cured with a nucleophilic addition curing agent. Exemplary of such a fuser member is an aluminum base member with a poly(vinylidenefluoride-hexafluoropropylene) copolymer cured with a bisphenol curing agent having lead oxide filler dispersed therein and utilizing a mercapto functional polyorgano siloxane oil as a release agent. In these fusing processes, the polymeric release agents have functional groups, also designated as chemically reactive functional groups, which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, metal salt, metal alloy or other suitable metal compound filler dispersed in the elastomer or resin upon the fuser member surface interacts with the functional groups of the siloxane polymeric release agent. Preferably, the metal containing filler materials do not cause degradation of or have any adverse effect upon the polymeric release agent having functional groups. Because of this reaction between the elastomer having a metal containing filler and the polymeric release agent having functional groups, excellent release and the production of high quality copies are obtained even at high rates of speed of electrostatographic reproducing machines. With these VITON®/lead oxide, or VITON®/copper oxide members, an oxide of low volume fraction is added to enable a specific functional release agent to react with it and thereby coat the silicone polymer oil like a polysiloxane, while with the present invention in embodiments the fillers, which are preferably selected in amounts of from about 55 to 70 volume percent based on amount of silicone rubber, are covered with a silicone hydride oil, rather than the polysiloxane oil. Thus, with the present invention improved toner and oil release is achieved from the fuser roll.

While the mechanism involved is not completely understood, it has been observed in embodiments of the present invention that when certain polymeric fluids having functional groups are applied to the surface of a fusing member having an elastomer surface with a metal oxide, metal salt, metal, metal alloy or other suitable metal compounds dispersed therein there is an interaction, a chemical reaction, coordination complex, hydrogen bonding or other mechanism between the active functional groups, like oxides, hydroxyls, halides, carboxylics, and the like, of the filler in the elastomer and the polymeric fluid having functional groups so that the polymeric release .agent having functional groups in the liquid provide an excellent surface for release having an excellent propensity to remain upon the surface of the fuser member. There appears, however, to be the formation of a film upon the elastomer surface which differs from the composition of the elastomer and the composition of the polymeric release agent having functional groups. This film, however, has a greater affinity for the elastomer containing a metal compound than the toner and thereby provides an excellent release coating upon the elastomer surface. The release coating has a cohesive force which is less than the adhesive forces between heated toner and the substrate to which it is applied and the cohesive forces of the toner. The interaction between the functional group of the polymeric release agent and the fillers in the elastomer results in an overall diminution of the critical or high surface energy of the fillers.

The use of polymeric release agents having functional groups, which interact with a fuser member to form a thermally stable, renewable self-cleaning layer having superior release properties for electroscopic thermoplastic resin toners, is described in U.S. Pat. Nos. 4,029,827; 4,101,686 and 4,185,140, all commonly assigned to the assignee of the present invention. Disclosed in U.S. Pat. No. 4,029,827 is the use of polyorgano siloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether and mercapto groups as release fluids.

SUMMARY OF THE INVENTION

In accordance with embodiments of the present invention there is provided a fuser member, and more specifically a silicone fuser member with fillers like metal oxides and wherein there is reacted with the aforementioned fillers a silicone oil with hydride functionality.

In embodiments of the present invention there are provided silicone rubber fuser rolls wherein there is reacted the hydride functionality contained in a silicone release oil with metal oxide fillers present in the silicone rubber coating of the fuser roll.

In one embodiment the present invention is directed to the provision of improved silicone fuser rolls by reacting a silicone release oil having silicone hydride functional groups on the ends thereof as pendant groups, and the like with fillers present in the silicone rubber fuser coating.

In embodiments, the fuser member is comprised of a core, such as metals, with a coating, usually continuous, of a thermally conductive and resilient compressible material which has a high thermomechanical strength, which coating includes alpha, omega, hydroxy polydimethyl siloxane with a number average molecular Weight of about 5,000 to about 20,000, finely divided tabular alumina, finely divided iron oxide, crosslinking agent, and crosslinking catalyst, and wherein the coating is present in various effective thicknesses of, for example, from about 10 to about 100 mils, and wherein there is applied to the fuser roll a silicone hydride release agent causing reaction of the release agent with a metal oxide filler. Examples of fuser members that may be selected for the present invention are illustrated in U.S. Pat. No. 4,373,239, the disclosure of which is totally incorporated herein by reference.

The present invention in embodiments is directed to a fuser member comprised of a substrate, thereover a silicone rubber containing a filler component therein, and wherein said filler component is reacted with a silicone hydride release oil; and a fuser member comprised of a substrate, thereover an adhesive layer, and a top layer of a polysiloxane silicon rubber coating containing a filler component, or filler components therein, and wherein said filler component is reacted with a silicone hydride release oil.

Examples of silicon hydride oils selected for the invention of the present application include those available from Huls Incorporated of Germany as, for example, Huls PS 123.8, PS 124, PS 124.5, and the like. These hydride functional oils can be selected as supplied, or they can be diluted with nonfunctional release oils commercially available, such as nonfunctional polydimethyi siloxanes. The concentration of the aforementioned diluted oil is for, example, from about 0.5 to about 99.5 weight percent of the hydride oil, and one preferred composition is comprised of 15 weight percent of PS 124.5 and 85 weight percent of the nonfunctional oil. Molecular weights, gram/mole, and viscosity in centistokes, for the hydride oil can be, for example, from about 5,000 to about 30,000 and about 100 to about 1,000 centistokes, respectively, while for the nonfunctional oils the corresponding values can be about 4,000 to about 8,000, and about 100 to about 20,000 centistokes, respectively.

Filler examples include metal oxides like oxides of aluminum, iron, silicon, and the like as illustrated in U.S. Pat. No. 4,373,239, the disclosure of which is totally incorporated herein by reference; oxides of titanium, zinc, copper, and silicon from, for example, about 5 to about 50 volume percent.

Examples of crosslinking components present in various effective amounts, such as from about 1 to about 15 weight percent, include orthosilic acid, esters of polysilic acid, alkyltrialkoxy silanes, and the like as illustrated in U.S. Pat. No. 4,373,239, the disclosure of which is totally incorporated herein by reference.

Catalyst examples include the amines and carboxylic salts of metals, such as zinc, zirconium, antimony, iron, calcium, tin, barium, cadmium, manganese and the like as illustrated in U.S. Pat. No. 4,373,239, the disclosure of which is totally incorporated herein by reference, chloroplantinic acid, and the like. Examples of specific preferred catalysts, include dibutyltin dilaurlate and dibutyltin diacetate, present in effective amounts, such as for example 0.1 to 0.2 part per 100 parts of the polymer like alpha, omega-hydroxy polydimethylsiloxane polymer.

In a further embodiment of the present invention, a fuser member for fusing thermoplastic resin toner images in a fusing system of the type wherein polymeric release agents having functional groups is supplied to the surface of the fuser member comprises a base support member, a thermally conductive silicone elastomer layer thereon with fillers like metal oxides therein, and wherein such fillers are caused to react with silicone oils that contain a SiH functional group, or groups.

In a further aspect of the present invention the siloxane or silicone oil is represented by the formula

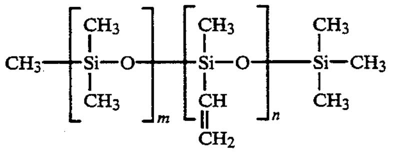

The fuser member of the present invention can thus be comprised of a base layer of a metal, like aluminum, a primer adhesive layer, such as known adhesives like Emerson Corning S11, Dow Corning 1200, Dow Corning 6060, organofunctional silanes available from Union Carbide, and a top surface layer of a siloxane; and wherein the fillers in such layer are permitted to react with a silicone hydride oil as illustrated herein.

Other features of the present invention will become apparent as the following description proceeds.

A typical fuser member of the present invention is described in conjunction with a fuser assembly comprised of a multilayered fuser roll comprising in sequential order a base support member, a relatively thick silicone elastomer layer thereover, an amino silane primer layer, an adhesive layer, and a metal oxide filler dispersed in the silicone elastomer layer, and wherein the filler is caused to react with a silicone oil with SiH functional groups, or functional group thereon. The base support member, which is typically a hollow cylinder or core, has suitable heating element disposed in the hollow portion thereof which is co-extensive with the cylinder. A backup or pressure roll cooperates with the fuser roll to form a fusing nip or contact arc through which a copy paper or other substrate passes such that toner images thereon contact the elastomer fusing surface of the fuser roll. The backup roll has a rigid steel core with a thin TEFLON®, Trademark of E.I. DuPont de Nemours, Inc., surface layer 24 thereon. A sump contains polymeric release agent having functional groups thereon. The release agent is one having SiH functional groups and reacted as indicated herein to provide an interfacial barrier layer between the fusing surface and the toner. Two release agent delivery rolls are provided for applying polymeric release agent to the surface from the sump. These two release agent delivery rolls are rotatably mounted to transport the release agent from the sump to the elastomeric fusing surface. One roll is partly immersed in the sump and transports on its surface release agent from the sump to the delivery roll. By using a metering blade, a layer of polymeric release fluid can be applied initially to the delivery roll and subsequently to the elastomeric fusing surface in a controlled thickness ranging from submicron thickness to a thickness of the order of several microns of release fluid. Accordingly, by a metering device a layer of release fluid about 0.1 to 2 microns or greater thicknesses can be applied to the surface of the elastomer fusing surface.

The metal oxide filler particles may possess irregular shapes, however, any form of metal oxide may be used in the fusing surface like powders, platelets, spheroids, fibers, oval particles, and the like. The base support member may be selected from any suitable material. Typically, it may be selected from aluminum, anodized aluminum, steel, nickel, copper and the like. In one embodiment, it is an aluminum tube or alternatively a flame sprayed aluminum coated steel tube.

According to the present invention, a multilayered fuser member is provided wherein a dramatic improvement in offsetting, substantially no image sticking, and the like are achieved.

Any suitable thermally conductive silicone elastomer rubber layer may be employed on the substrate. Typically, it is prepared from peroxide curable polyorgano siloxane generally known as high temperature vulcanizates (HTVs) which are typically polydimethyl siloxanes with pendant vinyl groups such as are illustrated herein

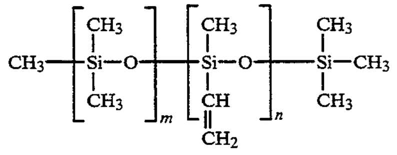

including trifluoropropyl, cyanopropyl, phenyl and vinyl are used to substitute for some of the methyl groups in order to impart specific cure, mechanical or chemical properties to silicone rubber. Introduction of phenyl groups reduces elasticity and increases tensile and tear strength of vulcanizates. Phenyl groups reduce vulcanization yield. Trifluoropropyl groups increase solvent resistance. Introduction of low percentages of vinyl groups reduces vulcanization temperature and imparts greater elasticity and lower compression set to rubbers. Peroxide cure gums may also be vinyldimethylsiloxy terminated. The peroxides most commonly used are benzoyl peroxide and bis(dichlorobenzoyl) peroxide. Dicumyl peroxide can be used for vinyl containing polymers. Generally, peroxide loading is 0.2 to 1.0 percent and cure is at 120° to 140° C. In addition, other peroxides, such as 2,5-dimethyl-2,5-bis(t-butyl peroxy)-hexane, can be used to crosslink HTVs at temperatures up to 180° C.

Typically, a layer of the HTV is applied to the core material by molding or extruding to a thickness of from about 1 millimeter to about 3 millimeters. It is typically cured for 20 to 30 minutes at a temperature between 120° C. to 180° C., depending on the particular peroxide employed.

Adhesive materials that are particularly effective include gamma amino propyltriethoxy silane available from Union Carbide under the product name Union Carbide ORGANOFUNCTIONAL SILANE A-1100™ and other suitable materials include N-(2-aminoethyl-3-aminopropyl) trimethoxysilane, 6-(aminohexylaminopropyl) trimethoxysilane, p-aminophenyltrimethoxysilane, 3-(1-aminopropoxy)-3,3-dimethyl-1 -propenyltrimethoxysilane, 3-aminopropyltris(methoxyethoxyethoxy) silane and N-(2-aminoethyl)-3-aminopropylmethyldimethoxy silane.

The metal oxide dispersed in the silicone rubber fuser coating should be capable of reacting with the functional groups of the Sill release oil, for example, to form a thermally stable film which releases the thermoplastic resin toner and prevents the toner from contacting the high surface energy filler. One preferred metal oxide is aluminum oxide, preferably present in an amount of from about 60 to 70 weight percent of the polymer component. The particle size of the metal oxide could be important and it should not be so small as to create excessive modulus of the curing of the polymer, nor so large as to provide large flaw sizes which initiate premature rupture of the compound. Typically, the average particle size of the metal oxide is from about 1 to about 75 microns, and preferably about 10 microns in diameter.

The surface of the fuser member of the present invention is preferably a roll, and preferably one prepared by casting or molding.

A fuser member can be prepared by molding or extruding an HTV silicone rubber heavily filled with conductive filler particles onto an aluminum core, which has been degreased and surface roughened by grit blasting, for example, and primed with conventional primer as desired, followed by curing and post cure.

The following Examples further define and describe fuser members prepared by the present invention, and illustrate further embodiments of the present invention. Unless otherwise indicated, all parts and percentages are by weight.

EXAMPLE I

180 Grams of a disilanol, RHODORSIL 48V750™ obtained from Rhone-Poulenc Company, and believed to contain an α, ω hydroxy polydimethyl siloxane having an average viscosity of about 750 centistokes, were mixed with 420 grams of RHODORSIL 48V3500™ disilanol, which is believed to be an α, ω hydroxy polydimethyl siloxane having an average viscosity of about 3,500 centistokes. The mixture is believed to be a disilanol having a number average molecular weight of about 15,000. The mixture was placed in a Baker Perkins Model AN2 mixer which was equipped with thermostatically controlled electrical heaters. To this mixture were added 1,284 grams of Alcoa T61 TABULAR ALUMINA™, 325 mesh, over a period of about ten minutes. Then, 150.6 grams of a MAPICO RED 297™ iron oxide having an ultimate particle size of about 0.4 micrometer were added to the mixture over a period of about 10 minutes, and the mixture was blended for about 2½ hours at room temperature. To this mixture were added about 45 grams of a SILBOND™ condensed ethyl silicate obtained from Stauffer Chemical Company, and mixing was continued for 1 hour. To this mixture were then added 3 grams of dibutyltin dilaurate catalyst, and the mixture was then coated on an aluminum roll at a thickness between 60 to 70 mils for testing as a fuser roll. The roll was brought to a temperature of 158° F. and cured for a period of 3 hours. The fuser roll was then placed in a xerographic copying machine, such as the Xerox Corporation 4850, for oil evaluation. Other fuser rolls were prepared and evaluated in a similar manner. The coated fuser rolls were operated at a circumferential roll speed of about 15 inches per second with a biasing force between the fuser roll and the pressure roll of 30 pounds per linear inch along the length of the fuser roll. The temperature of the fuser roll was maintained at a temperature of about 335° F. A release agent of 13,000 centistokes of nonfunctional polydimethyl siloxane oil was then applied to the fuser roll, and various types of preprinted forms were used as the substrate to fuse a toner of styrene-n-butylmethacrylate, 90 percent, and 10 percent of REGAL 330® carbon black thereon. Ink offset on to the fuser roll from incompletely dried preprinted forms became evident after about 10 developed copies rendering the process unacceptable.

EXAMPLE II

The fuser roll member of Example I was installed in a Xerox Corporation 4850 machine, and the release oil used was a nonfunctional polysiloxane oil available from Xerox Corporation as 1075 fuser oil. The ink used for the preprinted form was obtained from Ron Ink Company as LASER JET BLUE™, No. 61 Healstead Street, Rochester N.Y. The preprinted form from this ink without drying, when passed 12 times through the 4850 machine, showed ink offset to the fuser surface. The offset was noticed visually by examining the fuser surface. The preprinted forms printed with this ink, when dried for 52 hours at 25° C. and then passed through the above machine for 300 prints, showed minimal offset as evidenced by visual examination of the fuser roll surface.

EXAMPLE III

The fuser roll of Example I was tested in accordance with the process of Example II with the exception that a 15:85 mixture of hydride oil obtained from Huls of America as PS 123.8 and the Xerox Corporation 1075 fuser oil was selected. The preprinted form, which used LASER JET BLUE™ ink, evidenced no ink offset after only 3.5 hours drying at 25° C., and with no drying evidenced no ink offset.

EXAMPLE IV

The fuser roll of Example I was tested in accordance with the process of Example II with the Xerox Corporation 1075 nonfunctional fuser release agent. The form was printed with PANTONE 340-U GREEN™ ink available from Print Ink Company of Detroit. The preprinted form evidenced extensive offset; the form had to be dried for 50 hours to have no ink offset as in Example III.

EXAMPLE V

The process of Example IV was repeated with the functional hydride oil 15:85 mixture of hydride oil, obtained from Huls of America as PS 123.8, and the 1075 fuser oil. No offset was observed after 9 hours of drying, and without drying minimal offset was observed.

EXAMPLE VI

The process of Example I was repeated with the nonfunctional 1075 fuser oil in the Xerox Corporation 4850 and wherein the form was preprinted with HR RUBINE RED TM, provided by Print Ink Company. The form evidenced extensive offset, like in Example IV, to the fuser surface without drying of the ink, and for acceptable ink offset as in Example III, the form had to be dried for 50 hours.

EXAMPLE VII

The process of Example VI was repeated with the functional hydride oil 15:85 mixture of hydride oil, obtained from Huls of America as PS 123.8, and Xerox Corporation 1075 fuser oil. No offset was observed after 28 hours of drying, and without drying minimal offset was observed.

EXAMPLE VIII

The process of Example I was repeated with the 1075 fuser oil in the Xerox Corporation 4850 and wherein the form was preprinted with PANTONE 293-U BLUE TM. The form evidenced extensive, as in Example IV, ink offset to the fuser surface with drying for 350 hours.

EXAMPLE IX

The process of Example VIII was repeated with the functional hydride oil 15:85 mixture of hydride oil, obtained from Huls of America as PS 123.8, and the 1075 fuser oil. No offset was observed after 170 hours of drying, and without drying minimal offset was observed.

It is apparent from the above Examples that preprinted forms printed with, for example, various inks and when used for copying with standard 1075 fuser oil in a 4850 machine, showed extensive offset when these forms were not dried. For acceptable levels of offset, these forms are usually dried for extended periods of time. When a mixture of the hydride oil with the 1075 fuser oil was used, one observes either no offset or a minimal level of offset.

Other embodiments and modifications of the present invention may occur to those skilled in the art subsequent to a review of the information presented herein; these embodiments and modifications, as well as equivalents thereof, are also included within the scope of this invention.

What is claimed is:

1. A fuser member comprised of a substrate, thereover a layer of a silicone rubber including an inorganic particulate filler therein, wherein said inorganic filler selected from the group consisting of a metal, metal alloy, metal compound and silicon oxide, and a renewable release film over the layer of the silicone rubber comprised of silicone hydride oil formed by reacting said silicone hydride oil with the filler particles exposed on the surface of the silicone rubber layer, wherein the film is renewable upon wear of the film by reaction of additional silicone hydride oil with the exposed filler particles.

2. A fuser member comprised of a substrate, thereover an adhesive layer, a layer of a silicone rubber including an inorganic particulate filler therein over the adhesive layer, wherein said inorganic filler selected from the group consisting of a metal, metal alloy, metal compound and silicone oxide, and a renewable release film over the silicone rubber layer comprised of silicone hydride oil formed by reacting said silicone hydride oil with the filler particles exposed on the surface of the silicone rubber layer, wherein the film is renewable upon wear of the film by reaction of additional silicone hydride oil with the exposed filler particles.

3. A fuser member in accordance with claim 2 wherein subsequent to the reaction there results the film of release oil which is chemically bonded to the fuser surface, and wherein said substrate is a metal.

4. A fuser member according to claim 1 wherein the filler is a metal oxide.

5. A fuser member according to claim 2 wherein the filler is a metal oxide.

6. A fuser member according to claim 1 wherein the filler is aluminum oxide or iron oxide.

7. A fuser member according to claim 2 wherein the filler is aluminum oxide or iron oxide.

8. A fuser member according to claim 1 wherein the silicone rubber layer is a polydimethyl siloxane of the formula

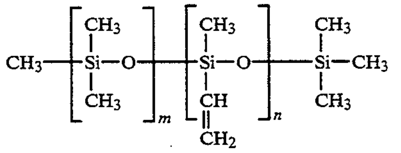

and wherein m and n represent the number of repeating segments.

9. The fuser member of claim 1 wherein the silicone rubber layer is from about 30 to about 90 mils thick.

10. The fuser member of claim 1 wherein the filler is a metal oxide which is present in an amount of from about 60 to about 70 weight percent of the silicone rubber.

11. The fuser member of claim 2 wherein the silicone rubber layer is from about 30 to about 90 mils thick.

12. The fuser member of claim 2 wherein the filler is a metal oxide which is present in an amount of from about 60 to about 70 weight percent of the silicone rubber.

13. A fuser member comprised of a substrate, a layer of a silicone rubber including an inorganic particulate filler therein, wherein said inorganic filler selected from the group consisting of a metal, metal alloy, metal compound and silicon oxide, and a renewable release film over the layer of the silicone rubber comprised of silicone hydride oil formed by reacting said silicone hydride oil with the filler particles exposed on the surface of the silicone rubber layer, wherein the film is renewable upon wear of the film by reaction of additional silicone hydride oil with the exposed filler particles.

14. A fuser member in accordance with claim 13 wherein the filler is a metal oxide.

15. A method comprising (a) providing a fuser member comprised of a substrate and a layer of a silicone rubber including an inorganic particulate filler therein, wherein said inorganic filler selected from the group consisting of a metal, metal alloy, metal compound and a silicon oxide; and (b) reacting a silicone hydride oil with the filler particles exposed on the surface of the silicone rubber layer, thereby creating a renewable release film comprised of the silicone hydride oil reacted with the exposed filler particles, wherein upon wear of the film, the film is renewable by reacting additional silicone hydride oil with the exposed filler particles.

* * * * *